US008286160B2

(12) United States Patent
Asai

(10) Patent No.: US 8,286,160 B2
(45) Date of Patent: Oct. 9, 2012

(54) METHOD OF INSTALLING APPLICATION PROGRAMS AND COMPUTER ACCESSIBLE RECORDING MEDIUM STORING INSTALLATION PROGRAM

(75) Inventor: Norihiko Asai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1041 days.

(21) Appl. No.: 12/245,413

(22) Filed: Oct. 3, 2008

(65) Prior Publication Data

US 2009/0094598 A1    Apr. 9, 2009

(30) Foreign Application Priority Data

Oct. 5, 2007    (JP) .................................. 2007-262234

(51) Int. Cl.
G06F 9/445    (2006.01)
(52) U.S. Cl. ........................................ 717/177; 717/171
(58) Field of Classification Search ........... 717/168–178
See application file for complete search history.

(56) References Cited

U.S. PATENT DOCUMENTS

| 2001/0052069 A1 | 12/2001 | Sekiguchi |
| 2004/0019822 A1 | 1/2004 | Knapp, III |
| 2005/0144617 A1 | 6/2005 | Chefalas et al. |
| 2006/0224705 A1 | 10/2006 | Takase |

FOREIGN PATENT DOCUMENTS

| JP | 10-149278 A | 6/1998 |
| JP | 11-296351 A | 10/1999 |
| JP | 2000-330742 | 11/2000 |
| JP | 2001-356913 A | 12/2001 |
| JP | 2003-202988 | 7/2003 |
| JP | 2003-280840 | 10/2003 |
| JP | 2005-227943 | 8/2005 |
| JP | 2006-085610 A | 3/2006 |
| JP | 2006-277446 A | 10/2006 |

OTHER PUBLICATIONS

EP Office Action dtd Jun. 30, 2011, EP Appln. 08017482.4.
JP Office Action dtd Jan. 12, 2010, JP Appln. 2007-262234, English translation.
CN Office Action dtd Mar. 16, 2011, CN Appln. 200810165899.7, English Translation.
EP office Action dated Nov. 18, 2011 in corresponding Application No. 08 017 482.4.
JP Office Action dtd Sep. 29, 2009, JP Appln. 2007-262234, English Translation.
EP Search Report dtd Feb. 18, 2009, EP Appln. 08017482.4.
EP Office Action dated Mar. 30, 2012, EP Application No. 08017482.4.
CN Office Action dated Feb. 23, 2012, CN Application No. 200810165899.7.

Primary Examiner — Ted T Vo
(74) Attorney, Agent, or Firm — Banner & Witcoff, Ltd.

(57) ABSTRACT

There is provided a method of installing an application program to an information processing device which is connected with a network to which an information processing server storing various pieces information are stored. The method includes the step of making the information processing device acquire setting information from the information server, the setting information being the information input through the information processing device when the application program was previously installed, the information processing device having the information processing server store the information, and the step of installing the application program based on the setting information which is acquired by having the information processing device acquire from the information processing server.

4 Claims, 10 Drawing Sheets

USER REGISTRATION PAGE

```
┌──────────────────────────────────────────┐
│ MyPage                            [?][X] │
├──────────────────────────────────────────┤
│ NEW USER REGISTRATION WINDOW             │
│                                          │
│     USER NAME        : [_____]  ~74   │
│                                          │
│     E-MAIL ADDRESS   : [_____]  ~75   │
│                                          │
│     MAIL ADDRESS     : [_____]  ~76   │
│                                          │
│     TELEPHONE No.    : [_____]  ~77   │
│                                          │
│     APPLICATION NAME : [_____]  ~78   │
│                                          │
│     SERIAL NUMBER    : [_____]  ~79   │
│                                          │
│     PASSWORD         : [_____]  ~72   │
│                                          │
│                         [CANCEL] [OK] ~73│
└──────────────────────────────────────────┘
```

FIG. 9

METHOD OF INSTALLING APPLICATION PROGRAMS AND COMPUTER ACCESSIBLE RECORDING MEDIUM STORING INSTALLATION PROGRAM

CROSS-REFERENCE TO RELATED APPLICATION

This application claims priority under 35 U.S.C. §119 from Japanese Patent Application No. 2007-262234 filed on Oct. 5, 2007. The entire subject matter of the application is incorporated herein by reference.

BACKGROUND

1. Related Art

The present invention relates to a method of installing application programs in an information processing device and a computer-accessible storage medium storing an installation program which makes a computer execute the method.

2. Prior Art

Conventionally, an installation program which is used for installing application programs (e.g., device drivers, word processing programs, etc.) in an image processing device such as a personal computer has been known.

As one of such installation programs, there is suggested an installation program which acquires settings, which will be referred to by an application after it is installed (hereinafter referred to as execution-time settings), during an installation process and stores the acquired execution-time settings in a storage area provided to the information processing device. An example of such an information processing device is disclosed in Japanese Patent Provisional Publication No. 2003-280840 (hereinafter, referred to as '840 publication).

Since the installation programs such as one disclosed in '840 publication acquires the execution-time settings during the installation of the application program, troublesome settings during the execution of the installed program can be suppressed.

SUMMARY OF THE INVENTION

When an OS (Operating System) implemented in the information processing device is re-installed, or the information processing device itself is to be changed to a new one, a user is required to re-install application programs which were once installed.

According to the prior art, various settings (hereinafter, referred to as installation-time settings) to be made when the installation is execute and/or a user registration for receiving a support to the application program (e.g., update of the application program) is generally required every time when an application program is installed.

That is, according to the prior art, every time when an application program is installed, the user is required to input the installation-time settings and/or the user registration information. Such an inputting process is troublesome for the user since it was once input.

In consideration of the above problem, the present invention is advantageous in that an improved method of installing an application program is provided, with which method the troublesome process when an application program is re-installed is suppressed. There is also provided a computer-accessible storage medium storing an installation program which makes a computer execute the above-described method.

According to aspects of the invention, there is provided a method of installing an application program to an information processing device which is connected with a network to which an information processing server storing various pieces information are stored. The method includes the step of making the information processing device acquire setting information from the information server, the setting information being the information input through the information processing device when the application program was previously installed, the information processing device having the information processing server store the information, and the step of installing the application program based on the setting information which is acquired by having the information processing device acquire from the information processing server.

With the above method, when the application program is re-installed, the user need not input the setting information again. Therefore, in comparison with the convention installation method, troublesome operation of the user is suppressed, and the installation can be executed conveniently.

According to aspects of the invention, there is provided a computer-readable storage medium containing an installation program which, when executed by a computer, realizes a method of installing an application program to an information processing device which is connected with a network using setting information including at least one setting item, the method comprising the step of requiring a user who installs the application program to input the setting information, the step of registering the setting information which is user when a normal installation is executed in an information processing server connected to the network, the step of acquiring the setting information from the information processing server if stored in the information processing server; and the step of executing a reference installation using the setting information acquired by the acquiring step.

It should be noted that the term "application program" used in the specification includes, for example, at least one of a word processing program, a spreadsheet program, a device driver for controlling a device such as an image forming device configured to form images on (in) a recording medium.

It is also noted that a term "installation" used in the specification means introducing software such as application programs in the image processing device such that the programs can run on the computer.

BRIEF DESCRIPTION OF THE ACCOMPANYING DRAWINGS

FIG. 1 is a block diagram showing a configuration of an image processing system including information processing devices and an information processing server according to the invention.

FIG. 2 schematically illustrates a concept of an installation package according to the invention.

FIG. 9 shows an example of a user registration dialog.

DETAILED DESCRIPTION OF THE EMBODIMENT

Hereinafter, referring to the accompanying drawings, an embodiment of the invention will be described.

Entire Configuration

Figure 1:
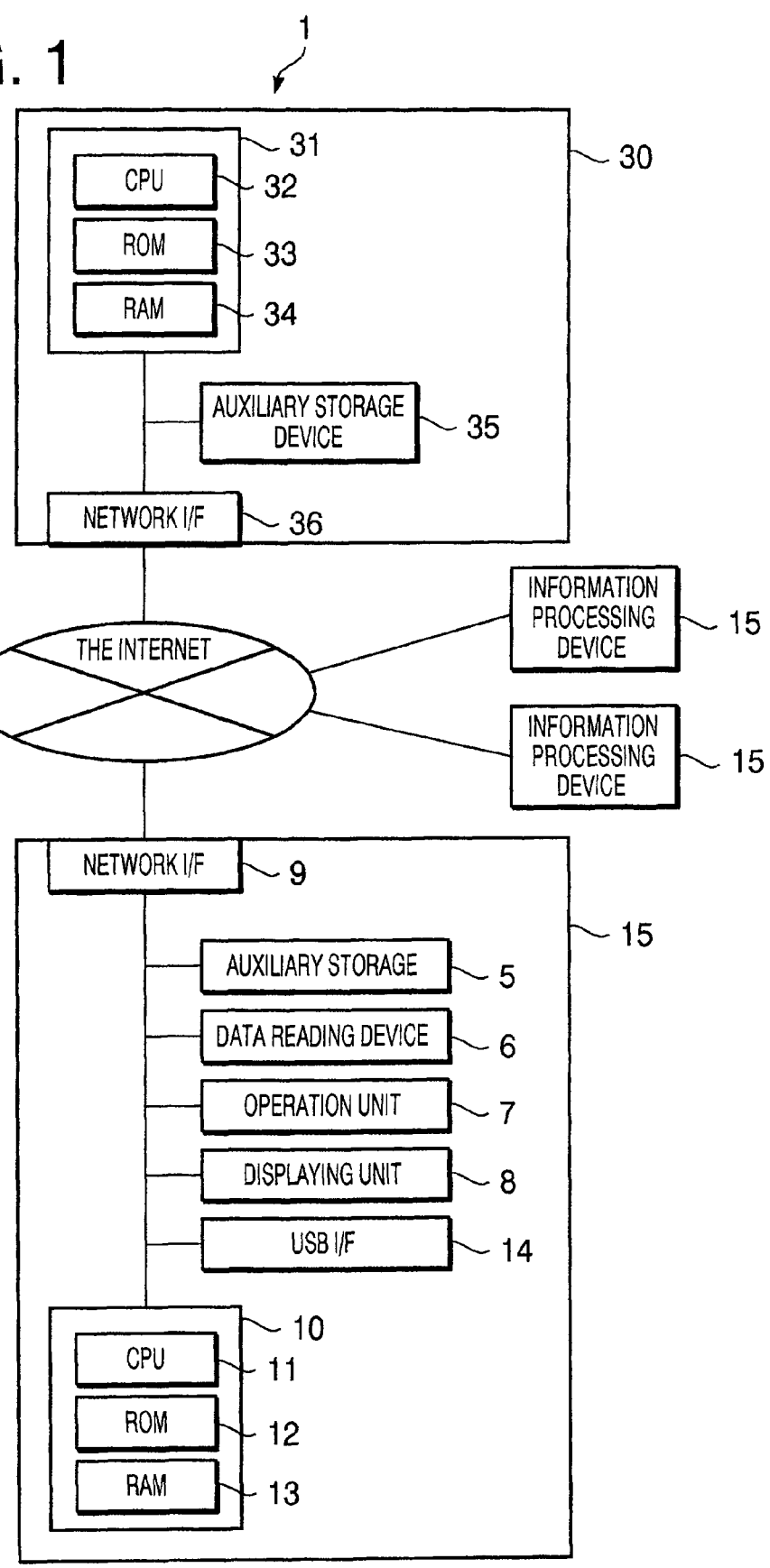

FIG. 1 is a block diagram showing a configuration of an information processing system 1 according to an embodiment of the invention.

The information processing system 1 is founded by a manufacturer, which manufactures and sells application programs, in order to provide users who have made user registrations with services (e.g., updating) regarding applications owned by the users. In the following description, manufactures who manufacture/sell the application programs will be simply referred to as a manufacturer, and users who have bought the application program and made the user registration regarding the application program will be referred to as target users. The services provided by the manufacturer include an updating of the program. Such a service provided by the manufacturer will also be referred to as a user support in this specification.

For this purpose (i.e., to provide the user support), the information processing system 1 includes information processing devices 15 used by the users, and an information processing server 30 which is configured to store various pieces of information necessary to provide with the user support. Each of the information processing terminal 15 is connected with the information processing server 30 via the Internet.

Information Processing Server

Next, the information processing server 30 will be described in detail.

The information processing server 30 is configured to function as a generally-known web server. As shown in FIG. 1, the information processing server 30 includes a network I/F (interface) 36, an auxiliary storage 35 and a controller 31.

The control device 31 executes a data communication with each information processing device 15 connected with the Internet via the network I/F 36. The control device 31 is provided with a ROM (Read Only Memory) 33 for storing programs and data which must be retained even when the control device 31 is powered off, a RAM (Random Access Memory) 34 for storing data temporarily generated during processes and/or temporarily transferred data or programs, and a CPU (Central Processing Unit) 32 which executes various processes in accordance with programs and data stored in the ROM 33 and RAM 34.

It should be noted that, in the ROM 33, a web server program is stored. The web server program causes the CPU 31 to receive a command for acquiring information (hereinafter, referred to as an acquisition request) from the information processing device 15, to judge whether information corresponding to the acquisition request is stored in the auxiliary storage 35, and to transmit a reply to the information processing device 15.

According to the embodiment, the auxiliary storage 35 may be a well-known HDD (Hard Disk Drive) including a high-capacity hard disk and a reading/writing device. The auxiliary storage 35 includes an acquired information storing area storing information for identifying application programs installed in the information processing device 15, information acquired from a subject user (i.e., user information) and the like acquired from the information processing device 15, and a transmission information storing area storing information to be transmitted to the information processing device 15.

In the specification, the user information means information acquired when a user registration is done. The user information is a personal information of the subject user and includes a name of the subject user, a name of a party, an address and a telephone number.

The information processing server 30 issues user IDs and passwords so that individual users can be distinguished from each other. Then, the information processing server 30 stores the user IDs, passwords and user information, which are associated with each other, in the acquired information storage area, thereby the user registration is finished. Regarding each of the passwords, as described later, a user's desired character string is accepted as the password.

As described above, in the information processing server 30, the CPU 32 executes a web process so that various functions for providing with the user support services are provided to the target users via the Internet.

Configuration of Information Processing Device

Next, the information processing device will be described in detail.

As shown in FIG. 1, the information processing device 15 is provided with a data reading device 6, an auxiliary storage 5, an operation unit 7, a displaying unit 8, a control unit 10, a network I/F (interface) 9 and a USB I/F (interface) 14. According to the embodiment, as the information processing device 15, a so-called personal computer (including the operation unit 7 and the displaying unit 8) is employed.

The data reading device 6 is configured to readout data stored in a computer-accessible storage medium such as a CR-ROM and a DVD-ROM.

The network I/F 9 functions to connect the information processing device 15 to a LAN (local area network), and executes data input/output with an external device that is connected to the Internet, through the LAN. The USB I/F 14 is for exchange data with an external device via a USB cable (not shown).

The operation unit 7 includes well-known input units such as a mouse and a keyboard, which are connected to the control unit 10 via a communication port such as the USB I/F 14 so that the user can input various pieces of information.

The display unit 8 includes a well-known display device such as an LCD (liquid crystal display). The display unit 8 is connected to the control unit 10 via a connection unit such as a video board (not shown) so that images output by the control unit 10 are displayed. On the display unit 8, with a GUI (graphical user interface) of the personal computer, user interface windows, mouse pointer and the like are displayed through which various pieces of information can be input.

The control unit 10 is provided with a ROM (read only memory) 12 storing data and programs which are to be retained even if the information processing device 15 is powered off. The control unit 10 is further provided with a RAM (random access memory) which temporarily stores data and/or programs transmitted from the auxiliary storage device 5 and data generated during execution of various processes, and a CPU (central processing unit) 11 which executes programs stored in the ROM 12 or RAM 13.

The auxiliary storage device 5 is, according to the embodiment, a well-known HDD (hard disk drive) which is an integrally configured a high capacity disk and a read/write device therefor. In the auxiliary storage device 5, at least, a program folder in which various application programs are stored, a system folder containing an OS (operation system), a registry in which information for executing the application programs stored in the program folder are stored.

Further, in the information processing device 15, at least a well-known OS (operating system) having a multi-task function capable of executing a plurality of processes at the same time and a well-known browser (browsing software) are installed. Under an environment of the OS, device drivers for controlling peripherals such as a printer and a scanner via the information processing devoice 15, document creating software, spreadsheet software, image processing program, and an installation program are executed.

Regarding Installation Program

Next, application programs and an installation package which is a collection of application programs to be installed and the installation program for installing the application programs in the information processing device 15.

Figure 2:
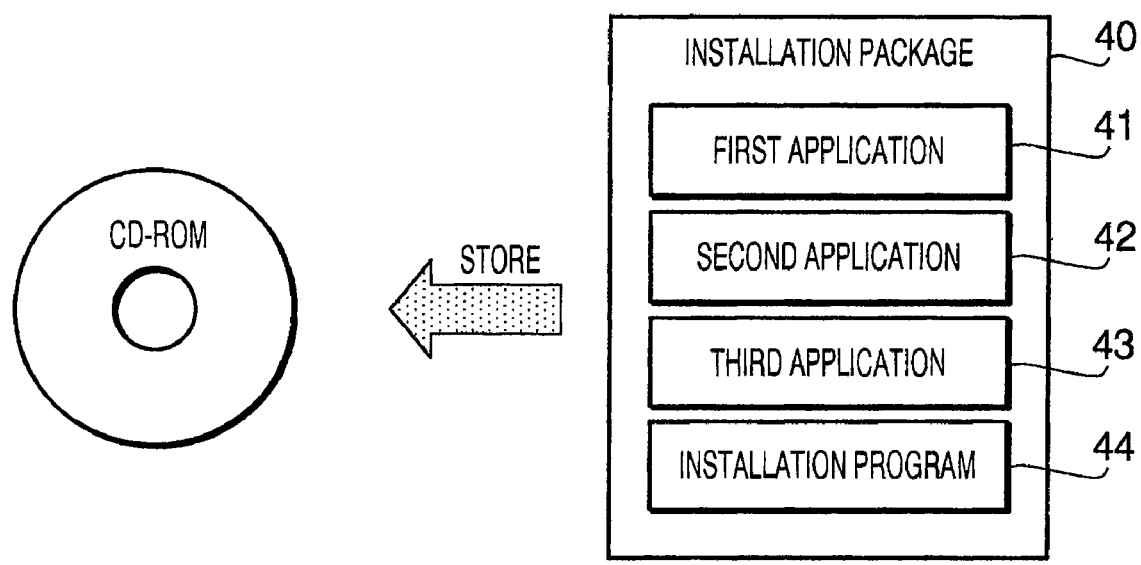

FIG. 2 schematically illustrates the concept of the installation package 40. The installation package 40 includes a first application program 41, a second application program 42 and a third application program 43, which are created and sold by the same application providing manufacturer but are different from each other, and the installation program 44 for installing the first through third programs in the information processing device 15.

In the following description, a group of the first through third programs 41, 42 and 43 will be referred to as an application package 41-43.

In the embodiment, the term "application program" is used to include a driver for controlling peripheral devices, and programs used for processing information acquired by the peripheral devices as well as well-known software including document creating software, spreadsheet software, presentation software and image processing software and the like.

For the purpose of explanation, in the following description, the first application program 41 is the document creating software, the second application program 42 is the spreadsheet software, and the third application program 43 is the presentation software.

The installation program 44 includes a new application installation program for newly installing an application program in the information processing device 15 and a registered application installation program for re-installing a program which has been registered with the information processing device 15, which are to be executed by the CPU 11.

The installation package 40 is distributed (e.g., sold) by the providing manufacturer in a form of a portable storage medium (e.g., a CD-ROM or a DVD-ROM). Each program contained in such a portable storage medium is retrieved by a reading unit corresponding to the storage medium (e.g., the data reading unit 6 of the information processing device 15).

New Application Installation Process

Next, a new application installation process executed by the CPU 11 of the information processing device 15 will be described.

Figure 4:
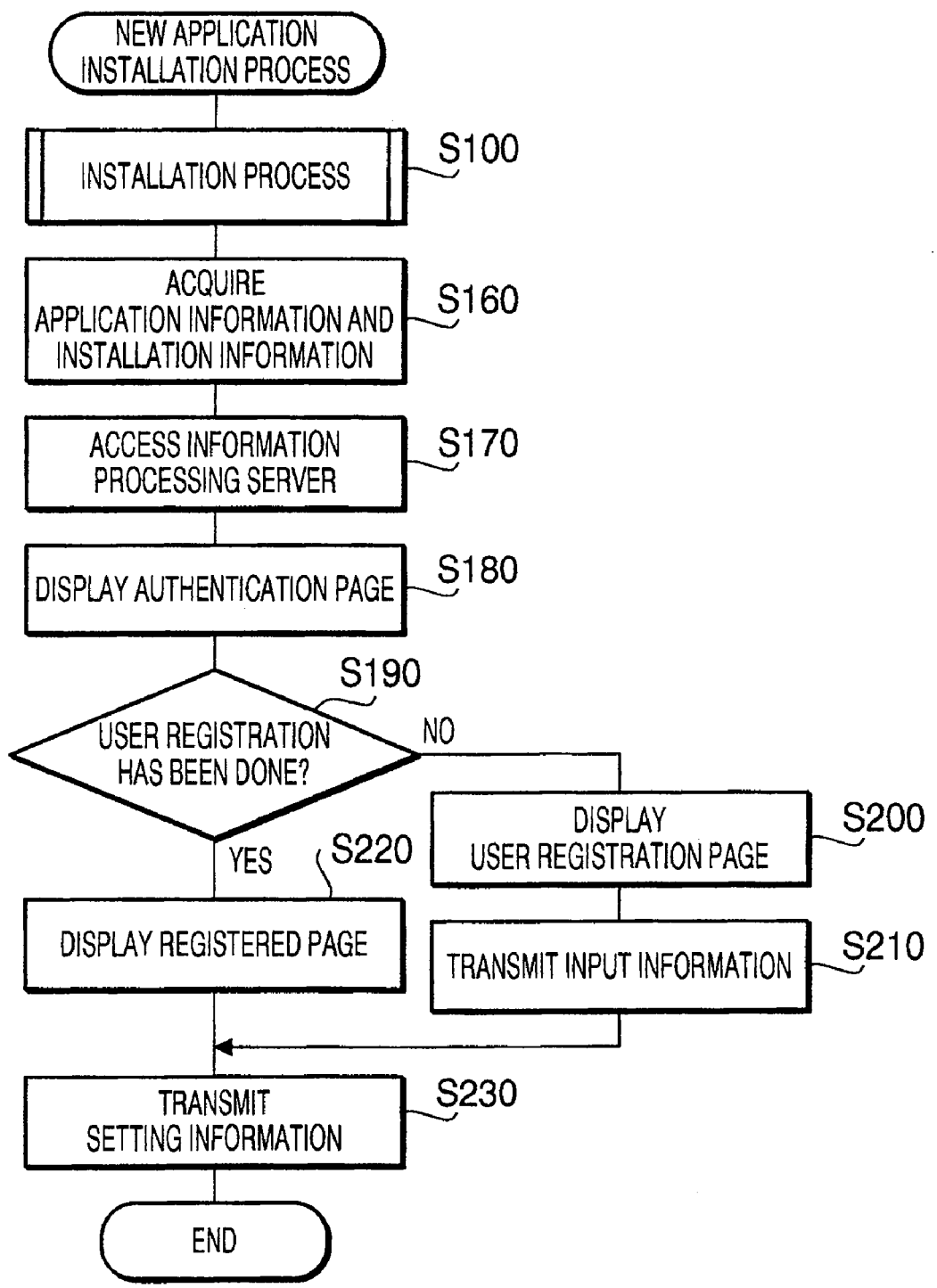
FIG. 4 is a flowchart illustrating a new installation process according to the invention.

FIG. 4 is a flowchart illustrating the new application installation process according to the embodiment. The new application installation process is executed when the installation package is retrieved by the data reading unit 6 and the user selects, through the operation unit 7 and/or the display unit 8, to install using the new application installation process.

When the new application installation process is started, the process initiates an installation process in S100.

Figure 6:
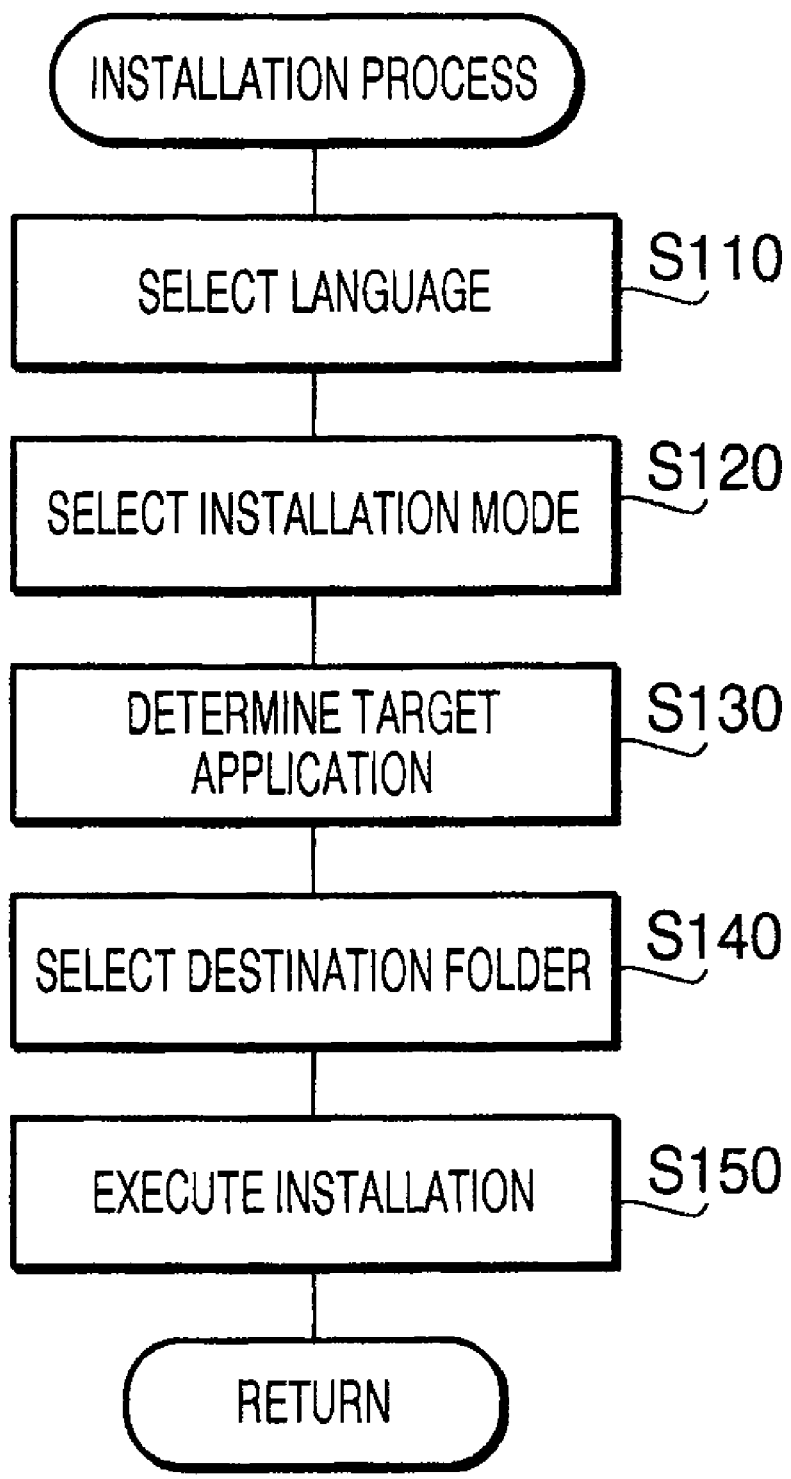
FIG. 6 is a flowchart illustrating an installation process, which is called in the re-installation process shown in FIG. 5, according to the invention.

FIG. 6 is a flowchart illustrating the installation process executed in S100 of FIG. 4. In S110, the CPU 11 displays a setting input window for allowing a user to select a display language on the display unit 8. When the user selects the display language, the CPU 11 executes S120.

It should be noted that the "setting input window" is an user interface window displayed on the display unit 8 for allowing the user to input a setting through the operation unit 7. The "display language" is a language used for displaying messages displayed on the setting input window and displayed on a user interface windows when the application program is executed. For example, the user can select one of the Japanese, English, French, Spanish, Arabian or Chinese as the display language.

In S120, the CPU 11 displays a setting input window for allowing the user to select a normal installation mode or a custom installation mode on the display unit 8. The normal installation mode is for installing at least one application program which is set by the providing manufacturer in advance. The custom installation mode is for installing at least one application program selected by the user. After receiving the user input for selecting the installation mode through the setting input window, the CPU 11 executes S130.

In S130, the CPU 11 determines the application program(s) to be installed in the new application installation process (hereinafter, referred to as target applications), and the CPU 11 then executes S140. Thus, if the normal installation is selected in S120, the predetermined application programs (i.e., the first through third application programs 41-43, according to the embodiment) are determined as the target applications. If the custom mode is selected, the selected one(s) of the application programs included in the installation package 40 are determined as the target applications.

In S140, the CPU 11 displays a setting input window allowing the user to input a destination where the target applications determined in S130 are installed on the display unit 8. Hereinafter, such a setting input window will be referred to as a destination input window). When the user inputs the destination, the CPU 11 executes S150.

Figure 7:
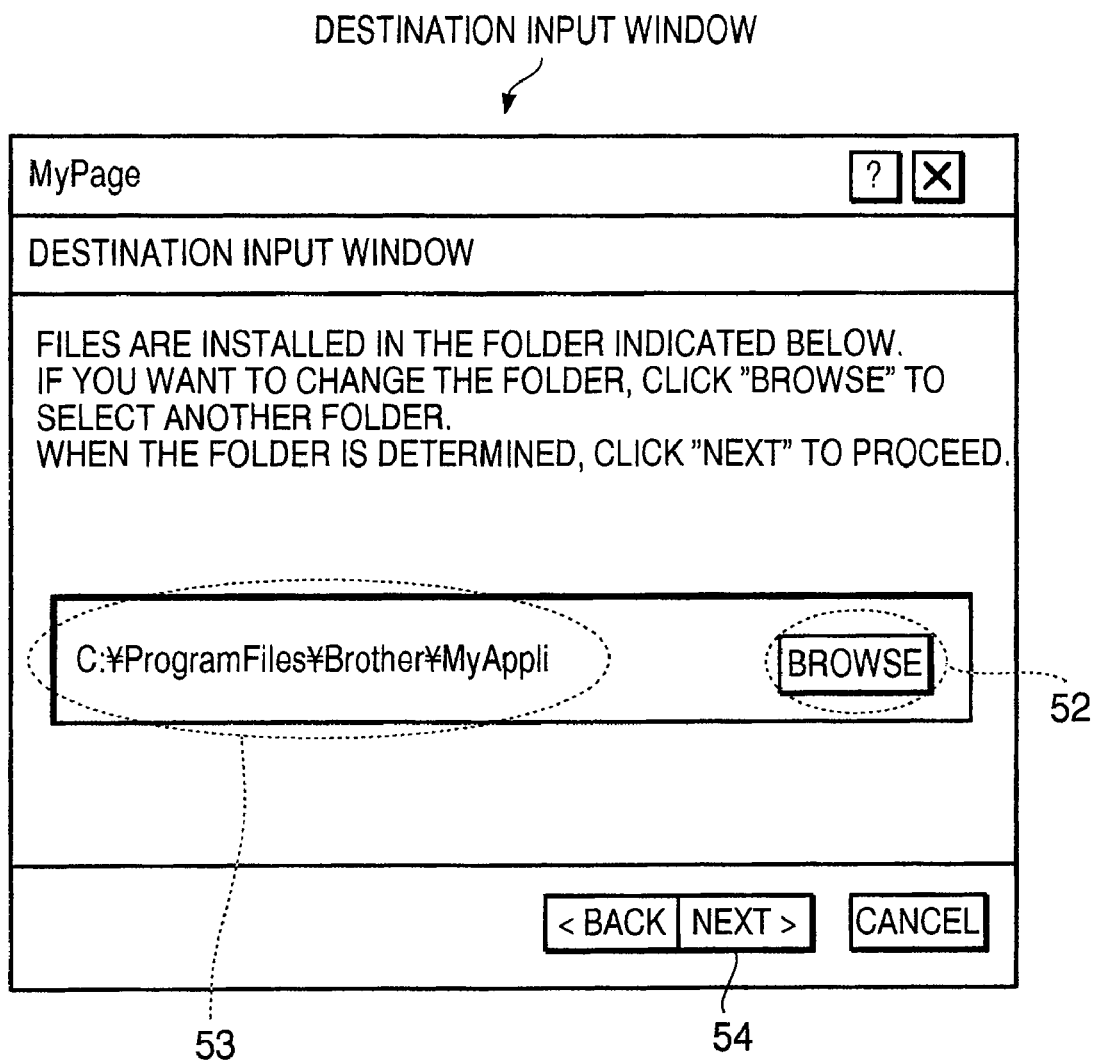
FIG. 7 shows an example of an installation destination process allowing a user to designate an installation destination.

Incidentally, FIG. 7 shows an example of the destination input window according to the embodiment. As shown in FIG. 7, the destination input window includes at least a folder indication box 53 displaying a newly created destination folder, a reference button 52 for changing the destination folder, and a "NEXT" button 54 which is to be operated (clicked) when the destination folder has been input.

When the "NEXT" button 54 is clicked, the CPU 11 acquires a folder displayed in the folder indication box 53 as the destination folder. If there are a plurality of target applications, S140 is repeated until destination folders for respective target applications have been acquired.

In S150, the CPU 11 installs all the target applications determined in S130 in the destination(s) acquired in S140. That is, the CPU 11 creates setting file which is referred to when each of the target applications is executed, and stores the thus created setting file and component files of each of the target applications in a program folder of the auxiliary storage device 5. Further, the CPU 11 registers information (e.g., stored locations of the component files) necessary for executing the target applications in the registry of the auxiliary storage device 5.

Figure 3A:
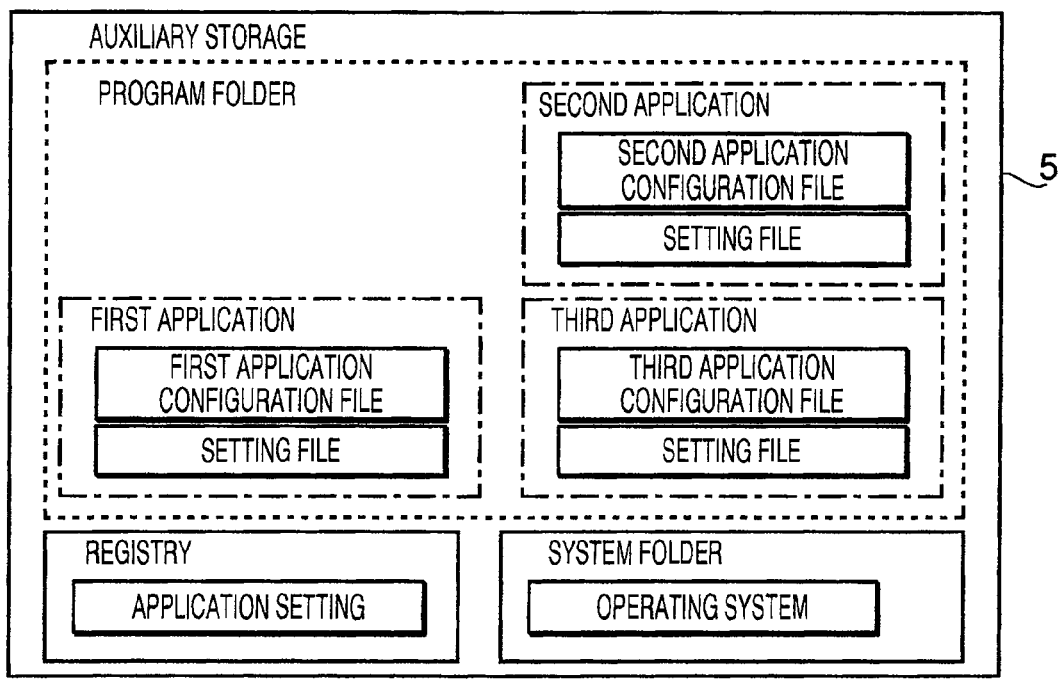
FIGS. 3A and 3B show a configuration of files stored in an auxiliary storage of the information processing server according to the invention.

Thus, in the program folder of the auxiliary storage device 5, first application component files which configure the first application program 41, and first setting file which is referred to when the first application program 41 is executed are stored as shown in FIG. 3A. Further, in the program folder of the auxiliary storage device 5, second application component files which configure the second application program 42, and second setting file which is referred to when the second application program 42 is executed, and third application component files which configure the third application program 43, and third setting file which is referred to when the third application program 43 is executed are stored. With the registry, information necessary for executing the applications stored in the program folder (hereinafter, such information will be referred to as application settings) is registered.

Thereafter, the process returns to the new application installation process. As shown in FIG. 4, the process acquires (S160) the application information regarding all the installed applications which are installed in S150 and the installation information referred to, in S140, when the target applications were installed. Then, the process proceeds to S170.

The installation information is the information necessary for installing the application and input by the user during the process of installation. The installation information includes the display language input in S110, the installation mode selected in S120, and the destination(s) received in S140.

The application information is the information necessary for identifying the application programs and acquired from the application settings registered with the registry, setting files stored in the program folder, and application component files. The application information includes types and names of the applications, version information, names of the providing makes and the like.

In the following description, a term "setting information" is used as a collective term of both the application information and the installation information.

In S170, the process accesses the information processing server 30 and acquires a user authentication page to judge whether the user registration has been done.

In S180, the process displays the user authentication page acquired from the information processing server 30 on the display unit 8. Then, the process acquires the user ID and password input by the user through the user authentication page displayed on the display unit 8.

Figure 8:
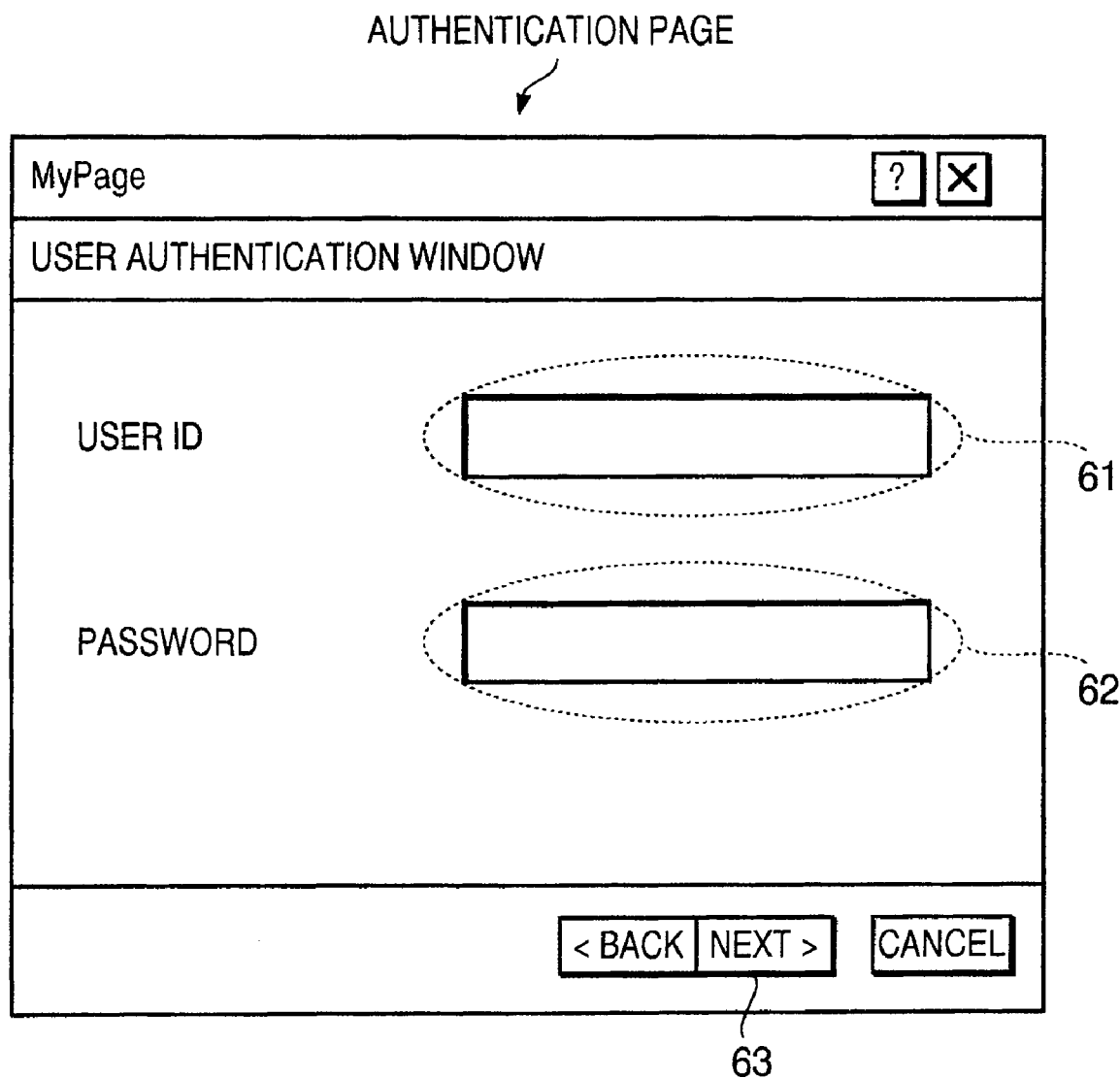
FIG. 8 shows an example of an authentication dialog requiring the user to input a user ID and a password for authentication.

FIG. 8 shows an example of the user authentication page. As shown in FIG. 8, the user authentication page includes an ID input box 61 in which the user ID, which was assigned when the user registration was made, is to be input, and a password input box 62 to which the password assigned when the user registration was made is to input. Further, the user authentication page includes a "NEXT" button 63. When the "NEXT" button is clicked, the process acquires the information input in the ID input box 61 and the password input box 62 as the user ID and the password, respectively.

In S190, the process checks whether the user registration has been done based on the user ID and the password which were acquired in S180 by accessing the information server 30. If the user registration has been done (S190: YES), the process proceeds to S220. If not (S190: NO), the process proceeds to S200.

Specifically, the process transmits the user ID and password acquired in S180 to the information processing server 30. Then, the information processing server 30 judges whether user information associated with the received user ID and the password (i.e., the user information of the target user) is stored in the acquired information storing area of the auxiliary storage device 35. If the user information of the target user is stored (i.e., the user registration has been done), page data indicating the registered user information is transmitted to the information processing device 15. If the registration has not been done, a user registration page requiring the user to input user registration information to the information processing device 15 is displayed.

Thus, the information processing device 15 determines that the user registration has been completed if the information acquired from the information processing server 30 is the registration page information. If the information acquired from the information processing server 30 is the user registration page information, the information processing device 15 determines that the user registration has not been done.

When the "NEXT" button 63 is clicked, if information is not input in at least one of the ID input box 61 and the password input box 62, the information processing server 30 (i.e., the CPU 32) judges that the user information of the target user has not been input.

If the process judges that the user registration has not been completed (S190: NO), in S200, the process displays the user registration page received from the information processing server 30 on the display unit 8. Then, after the input information is acquired through the user registration page, the process proceeds to S210.

FIG. 9 shows a user registration page displayed on the display unit 8. As shown in FIG. 9, the user registration page includes a user information input box 71 for inputting the user information and a password input box 72 for inputting a user-desired character string as a password to be referred to when the authentication is performed. The user registration page further includes an "OK" button 73 which is to be clicked when the input of the user information and the password is completed.

The user information input box 71 includes a user name input box 74 for inputting the name of the user, an e-mail address input box 75 for inputting an e-mail address of the user, a mail address input box 76 for inputting a mail address of the user, a telephone number input box 77 for inputting a telephone number of the user, an application program name input box 78 for inputting the name of the target program and a serial number input box 79 for inputting a serial number of the target application.

When the "FINISH" button 73 is clicked, the process acquires the information input in the input boxes 72 and 74-79.

In S210, the process transmits the input information acquired in S200 to the information processing server 30. Then, the information processing server 30 stores the received information in the acquired information storage area as the user information, issues the user ID and the password (which is the character string input by the user), thereby completing the user registration.

Thereafter, the information processing server 30 transmits the issued user ID and password to the information processing device 15. Then, the information processing device displays the user ID and the password on the display unit 8. Then, the process proceeds to S230. As the user ID and the password are displayed on the display unit 8, the user can confirm the user ID and the password issued for the user.

If it is judged in S190 that the user registration has been done, the process proceeds to S220, where the process displays the registered page received from the information processing server 30 on the display unit 8 and proceeds to S230. As the registered page is displayed on the display unit 8, the user can confirm the user information by himself/herself.

It should be noted that the timing at which the process proceeds from S220 (or S210) to S230 may be a predetermined period after the display of the registered page (or user ID and the password in S210), or at the time when the information processing device 15 acquires that the "CONFIRM"

button included in the setting input window which is displayed on the display unit 8 is clicked.

In the latter case, the user ID and the password (S210) or the registered page (S220) should be displayed as the setting input window, and the setting input window should be provided with the "CONFIRM" button, a click of which is acquired by the information processing device 15 as a command to proceed the next step.

The process transmits the setting information acquired in S160 to the information processing server 30 in S230. The information processing server 30 stores the received setting information in the acquired information storage area.

Figure 3B:
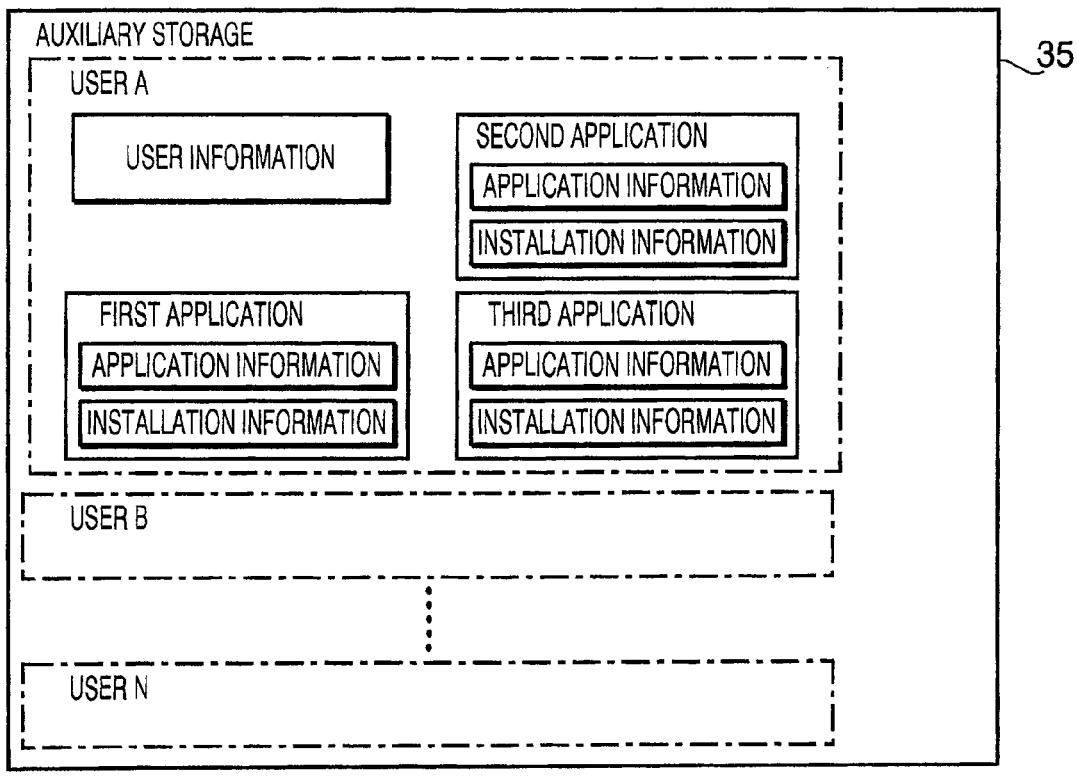

Thus, in the acquired information storage area of the information storage server 30, the user information and the setting information are stored for each target user as shown in FIG. 3B. In particular, for the setting information, the application information and the installation information are stored for each target application.

After execution of the above steps, the new application installation process is finished.

Registered Application Installation Process

Next, the registered application installation process executed by the CPU 11 of the information processing device 15 will be described.

Figure 5:
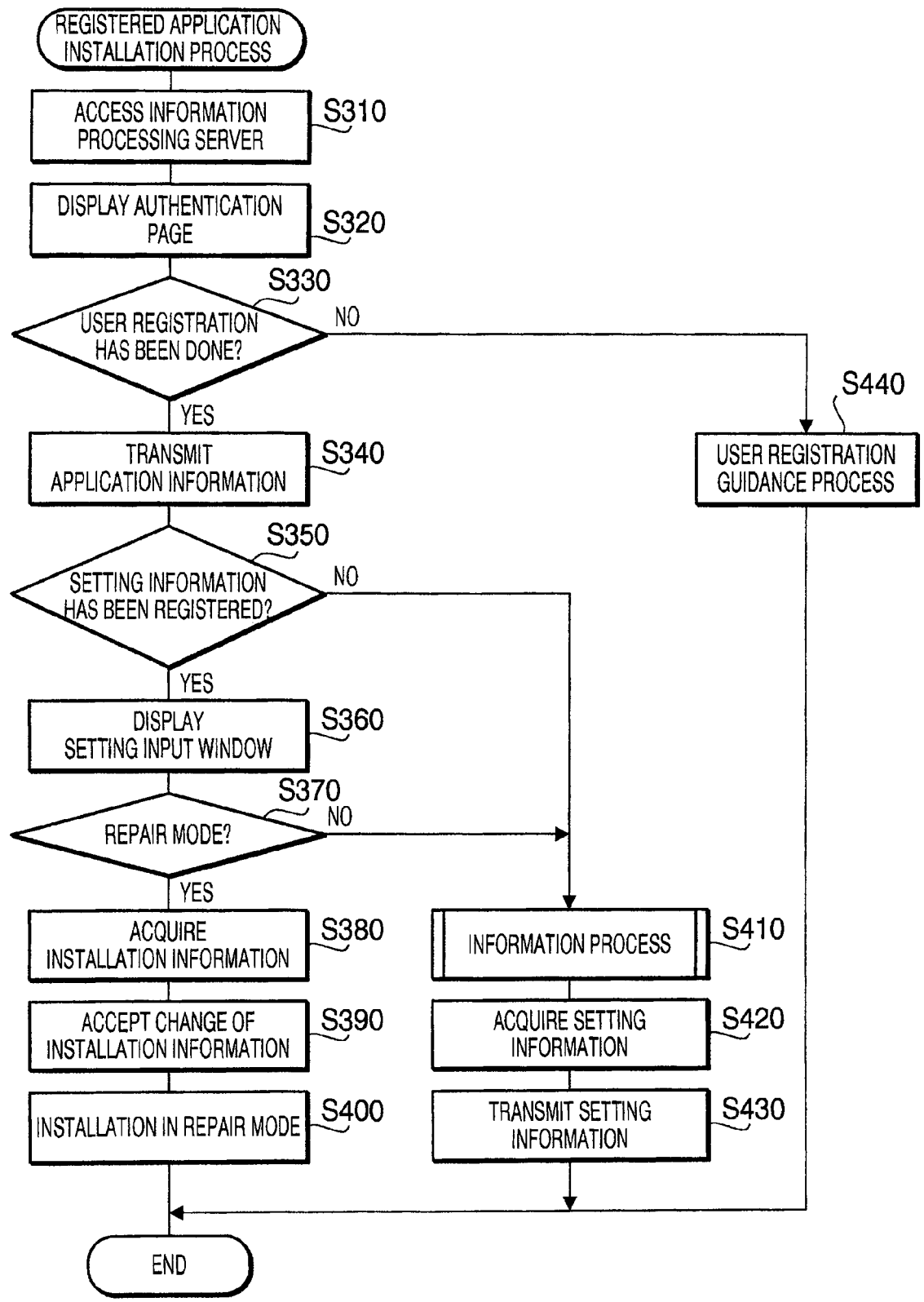
FIG. 5 is a flowchart illustrating a re-installation process according to the invention.

FIG. 5 is a flowchart illustrating the registered application installation process.

The registered application installation process is executed when the data reading device 6 retrieves the installation package 40 and the user selects installation of the registered application installation program through the operation unit 7 or the display unit 8.

When the registered application installation process is started in S310, the process accesses the information processing server 30 and acquires the user authentication page for judging whether the user registration has been done from the information processing server 30.

In S320, the process displays the user authentication page acquired from the information processing server 30, and acquires the user ID and the password which are input through the user authentication page. Since the user authentication page is the same as that referred to the new application installation process, detailed description thereof is omitted for brevity (see FIG. 8).

In S330, the user referred to the information processing server and judges whether the user ID and the password acquired in S320 have been registered. If the user registration has been done (S330: YES), the process proceeds to S340. If the user registration has not been done, the process proceeds to S440.

Specifically, the process transmits the user ID and the password acquired in S320 to the information processing server 30. Then, the information processing server 30 judges whether the user information of the target user is stored. If the information processing server 30 determines that the user information of the target user is stored, it transmits information indicating that the user information has been registered to the information processing device 15. If the user information of the target user is not stored, the information processing server transmits the information indicating that the user information is not registered to the information processing device 15.

In S440 (i.e., if the user registration has not been done), the process displays an image window recommending the user to do the user registration on the display unit 8, and the registered application installing process is finished.

In S340 (i.e., if the user registration has been done), the process acquires the application information of all the applications included in the installation package 40 retrieved by the data reading device 6, and transmits the retrieved application program to the information processing server 30. Then, when receives the application information from the information processing device 15, the information processing server 30 judges whether the setting information regarding the corresponding application program is stored in the acquired information storage area, and then transmits the judgment result (hereinafter, referred to as setting information storage result) to the information processing device 15.

Specifically, according to the embodiment, if the application information corresponding to the application information received from the information processing device 15, the information processing server 30 presumes that the install information is stored, and the information processing server 30 judges that the setting information is stored.

When the setting information storing result is received from the information processing server 30, the information processing device 15 proceeds to S350. In S350, the process judges whether the setting information is stored in the information processing server 30 based on the setting information result. If the process judges that the setting information is stored in the information processing server 30, the process proceeds to S360.

In S360, the process displays the setting input window for allowing the user to select a repair mode or a normal mode as an installation mode. It is noted that the repair mode is for re-installing the application program referring to the installation information stored in the information processing server 30, and the normal mode is for re-installing the application program based on the installation information re-input by the user. When the installation mode is acquired through the setting input window, the process proceeds to S370.

In S370, the process judges whether the installation mode acquired in S360 is the repair mode. If the installation mode is the mode other than the repair mode (i.e., the installation mode is the normal mode), the process proceeds to S410.

If the process judges in S350 that the setting information is not stored in the information processing server 30, the process proceeds to S410. That is, if the application is to be re-installed in the normal mode (e.g., if the setting information is not stored), the process proceeds to S410.

In S410, the process executes the installation process and executes installation of the application programs included in the installation package 40.

In S420, the process acquires the setting information of all the application programs installed in S410, and proceeds to S430. In S430, the process transmits the setting information acquired in S410 to the information processing server 30. Then, when the setting information is received, the information processing server 30 stores the received setting information in the acquired information storage area. If the information processing server 30 stores the setting information (S350: YES) and the installation mode is the normal mode (S370: NO), the information processing server 30, which received the setting information transmitted by the information processing device 15 in S430, stores the received setting information to update the setting information stored in the acquired information storage area. Then, the registration application installation process is finished.

If, in S370, it is judged that the installation mode is the repair mode, the process proceeds to S380.

In S380, the process acquires the user information and setting information from the information processing server 30, and stores the acquired setting information in a temporary file (e.g., an INI file) and the process proceeds to S390.

Then, in S390, the process displays the contents of the installation information input by the user when the application program was previously installed based on the user information and setting information acquired in S380. Further, the process displays the setting input window (hereinafter, referred to an installation information change input window) on the display unit 8.

Figure 10:
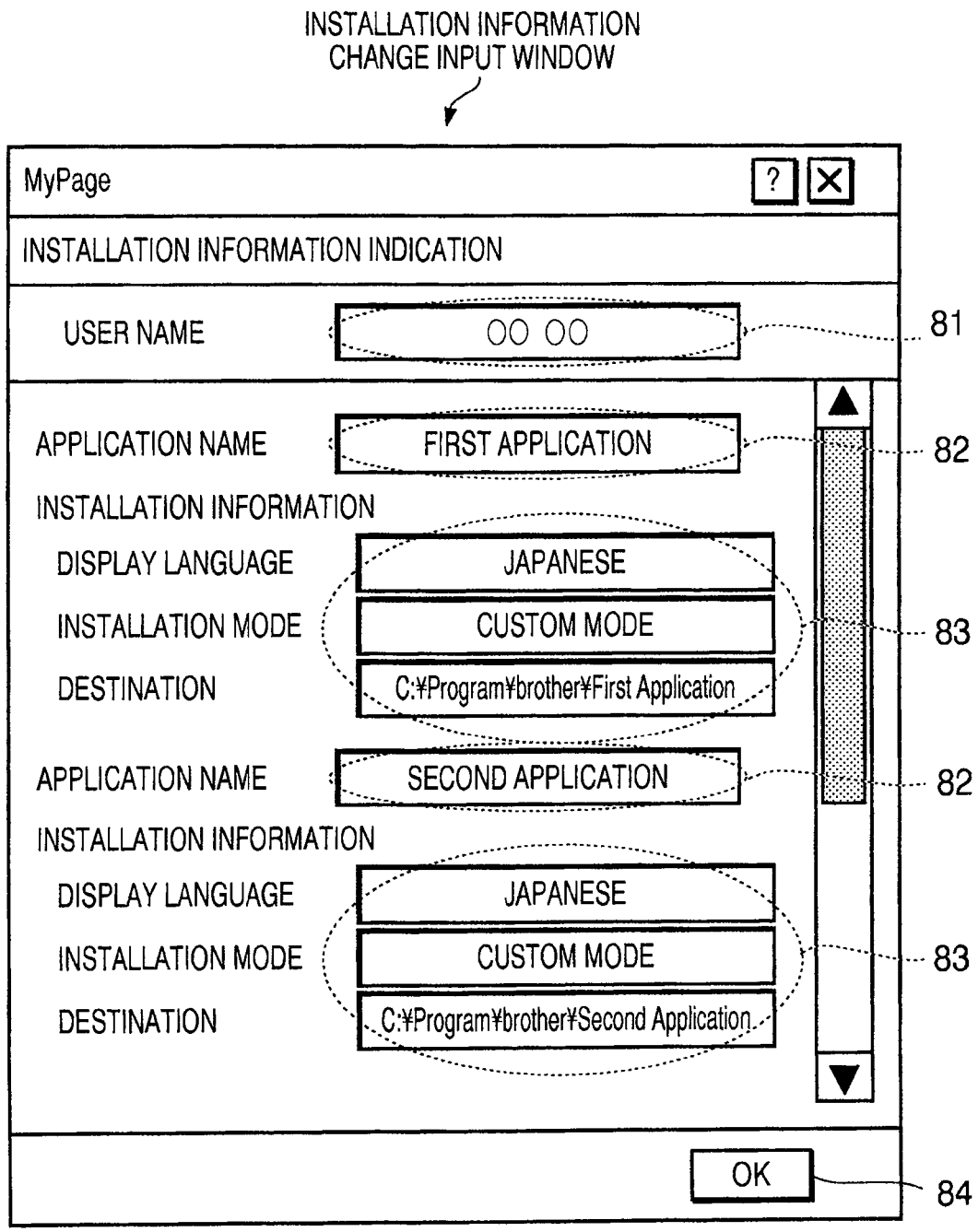
FIG. 10 shows an example of an installation information confirmation/modification dialog.

Specifically, according to the embodiment, the installation information change input window includes, as shown in FIG. 10, a user name display box 81 for displaying the user name based on the application information, an application name displaying box 82 for displaying the application name based on the application information and the installation information stored in the information processing server 30. Further, the installation information change input window includes an installation information display box 83 for inputting the change of the information, and an "OK" button 84 which is to be clicked when input of the information is finished.

The installation information display box 83 includes a plurality of item input boxes for displaying installation items such as the display language, installation mode, destination and the like, respectively. The item input boxes are configured to accept the change made by the user.

When the "OK" button 84 is clicked, the process reflects the information indicated on the installation information box 83 to the installation information stored in the temporary file, and proceeds to S390. If no change is input in the installation information display box 83, the installation information stored in the information processing server 30 is retained as it is.

In S390, the process refers to the installation information stored in the temporary file and executes the re-installation pf the application program (i.e., the installation in the repair mode).

According to the installation in the repair mode, the setting file is created and the setting file and the application component files are stored in the destination stored in the temporary file, based on the information (e.g., display language) stored in the temporary file. Then, the registered application installation process is finished.

When the information processing device 15 executes the registered application installation program, if the setting information of the user is stored in the information processing server 30, it becomes possible to install the application based on the setting information stored in the information processing server 30 (i.e., the installation in the repair mode becomes possible).

When the installation is executed in the repair mode, the installation of the application program is executed based on the setting information acquired from the information processing server 30. Therefore, the user need no input the setting information unnecessarily.

As described above, according to the registered application installing process, if the application program is installed in the repair mode, troublesome inputting process of the user can be suppressed.

In particular, according to the registered application installing process, when the installation in the repair mode is selected, the contents of the installation information stored in the information processing server 30 is displayed in the installation information change input window. Therefore, the user can recognize the installation information which was input when the application was previously installed.

Further, according to the registered application installation process, when the installation in the repair mode is selected, for part of the setting items of the installation information, the contents input when the application program was previously installed may used, while part of the setting items may be changed.

Therefore, according to the installation process described above, the user can change the setting items which are necessary to be change depending on the execution environment when the application program is installed. Thus, unnecessary input operation can be avoided, while the setting convenient to the user can be achieved.

As above, according to the registered application installation process, convenient installation process can be achieved.

Further, according to the new application installation process, if the user information is not registered in the information processing server 30 (i.e., the user registration has not been made), the user information is acquired, while when the user registration has already been done, the user information stored in the information processing server 30 is displayed and a new user registration is not accepted.

Accordingly, when the application program is installed, it is avoided that the user information having been stored in the information processing server 30 is input again. As a result, the user will not be required to perform the inputting operation unnecessarily, and thus troublesome input operation of the user in the installation operation can be suppressed.

Further, according to the new application installation process, if the user registration has not been done, by displaying the user information which was input in the previous user registration is displayed so that the user can check whether there are errors in the user information.

Modifications

It should be noted that the present invention need not be limited to the configuration of the above-described exemplary embodiment. The configuration can be modified in various ways without departing from the scope of the invention.

According to the embodiment, in the registered application installing process, if the information processing server 30 stores the setting information, the user is allowed to select the installation mode. This may be modified such that the repair mode is automatically selected.

In the repair modes according to the invention, the process acquires change of the installation information stored in the information processing server 30 and reflects the change in the installation information before the installation of the application program is executed. The installation of the application program in the repair mode need not be limited to such a configuration. That is, the installation may be automatically executed using the installation information stores in the information processing server 30 as it is, without acquiring the change of the install information.

In the embodiment, when the installation package is retrieved by the data reading device 6, the user can select the registered application installation process or the new application installation process.

As a modification, a main installation process may be automatically executed when the installation package is retrieved by the data reading device 6. Then, in the main installation process, the user may be allowed to select the new application installation process or the registered application installation process. Alternatively, the information processing device 15 may judge whether the setting information is stored in the information processing server 30, and automatically executes the new application installation process or the registered application installation process depending on the judged result.

According to the embodiment, the document creation software, the spreadsheet software and the presentation software are referred to as the first, second and third applications 41-43, respectively. The application programs need not be limited to this configuration and, for example, a device driver for controlling a peripheral device may be included in the installation package.

According to the embodiment, the installation package is stored in the portable storage medium, and provided to the user by the providing make. The installation package may be distributed need not be limited to such a manner. For example, the installation package may be provided to the information processing device 15 from a server or the like through the Internet.

According to the embodiment, a user registration is accepted during the new application installation process and the registered application installation process. However, the user registration need not be executed during the installation process. For example, after the installation of the application program is finished by the new application installation process, the user may be allowed to access the information processing server 30 for the user registration.

What is claimed is:

1. A method of installing an application program to an information processing device which is connected with an information processing server via a network using setting information including at least one setting item, the method comprising the steps of:

determining whether to execute a normal installation or a reference installation based on whether a user registration has been performed and the setting information has been stored in the information processing server;

if it is determined to execute the normal installation,
transmitting a request for a user who installs the application program to input the setting information,
receiving the setting information input by the user in response to the request for the user who installs the application program to input the setting information,
executing the normal installation using the setting information input by the user, and
transmitting the setting information to the information processing server to store the setting information in the information processing server; and if it is determined to execute the reference installation,
acquire acquiring the setting information from the information processing server,
displaying the acquired setting information on a display unit,
transmitting a request for the user to select whether the setting information acquired from the information processing server is to be changed,
receiving the user selection in response to the request for the user to select whether the setting information acquired from the information processing server is to be changed,
transmitting a request for the user to input the change for each setting item if the user selection indicates that the setting information acquired from the information processing server is to be changed,
receiving the change input by the user in response to the request for the user to input the change for each setting item,
executing the reference installation using the setting information which reflects the change input by the user in a case that the change has been input by the user, and
executing the reference installation using the setting information acquired from the information processing server in a case that no change has been input by the user.

2. A non-transitory computer-readable storage medium containing an installation program which, when executed by a computer, realizes a method of installing an application program to an information processing device which is connected with an information processing server via a network using setting information including at least one setting item, the method comprising the steps of:

determining whether to execute a normal installation or a reference installation based on whether a user registration has been performed and the setting information has been stored in the information processing server;

if it is determined to execute the normal installation,
transmitting a request for a user who installs the application program to input the setting information,
receiving the setting information input by the user in response to the request for the user who installs the application program to input the setting information,
executing the normal installation using the setting information input by the user, and
transmitting the setting information to the information processing server to store the setting information in the information processing server; and if it is determined to execute the reference installation,
acquiring the setting information from the information processing server,
displaying the acquired setting information on a display unit,
transmitting a request for the user to select whether the setting information acquired from the information processing server is to be changed,
receiving the user selection in response to the request for the user to select whether the setting information acquired from the information processing server is to be changed,
transmitting a request for the user to input the change for each setting item if the user selection indicates that the setting information acquired from the information processing server is to be changed,
receiving the change input by the user in response to the request for the user to input the change for each setting item,
executing the reference installation using the setting information which reflects the change input by the user in a case that the change has been input by the user, and
executing the reference installation using the setting information acquired from the information processing server in a case that no change has been input by the user.

3. The non-transitory computer-readable storage medium according to claim 2, wherein the method further comprises the step of executing a user information registration process which allows the user to input user information and register the input user information with the information processing server, wherein the user information is stored in the information processing server together with the setting information.

4. The non-transitory computer-readable storage medium according to claim 3, wherein the method further comprises the step of:

executing an authentication process for allowing the information processing server to authenticate that the user has been registered with the information processing server.

* * * * *